United States Patent
Osako et al.

(10) Patent No.: US 6,855,185 B2
(45) Date of Patent: Feb. 15, 2005

(54) METHOD OF MANUFACTURING NIOBIUM AND/OR TANTALUM POWDER

(75) Inventors: Toshiyuki Osako, Ichikawa (JP); Tetsufumi Komukai, Ichikawa (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 93 days.

(21) Appl. No.: 10/268,615

(22) Filed: Oct. 10, 2002

(65) Prior Publication Data

US 2003/0070509 A1 Apr. 17, 2003

(30) Foreign Application Priority Data

Oct. 12, 2001 (JP) ........................................ 2001-315470

(51) Int. Cl.[7] .................................................. B22F 9/20
(52) U.S. Cl. ............................................. 75/363; 75/368
(58) Field of Search ........................... 75/363, 367, 368, 75/369

(56) References Cited

U.S. PATENT DOCUMENTS

| | | | | |
|---|---|---|---|---|
| 4,508,563 A | * | 4/1985 | Bernard et al. ............... 419/29 |
| 5,242,481 A | * | 9/1993 | Kumar .......................... 75/364 |
| 6,136,062 A | * | 10/2000 | Loffelholz et al. ............ 75/369 |
| 6,171,363 B1 | * | 1/2001 | Shekhter et al. .............. 75/369 |
| 6,193,779 B1 | | 2/2001 | Reichert et al. |
| 2002/0066338 A1 | * | 6/2002 | Shekhter et al. .............. 75/245 |
| 2003/0110890 A1 | * | 6/2003 | He et al. ...................... 75/363 |

FOREIGN PATENT DOCUMENTS

| JP | 2003/013115 | * | 1/2003 |
|---|---|---|---|
| JP | 2003/129115 | * | 5/2003 |

* cited by examiner

Primary Examiner—George Wyszomierski
(74) Attorney, Agent, or Firm—Katten Munchin Zavis Rosenman

(57) ABSTRACT

A method of manufacturing niobium and/or tantalum powder consisting of: a first-stage reduction process of reducing niobium and/or tantalum oxides with alkali metals and/or alkaline-earth metals to obtain low-grade oxide powder represented by (NbTa) Ox, where x=0.06 to 0.35, a process of removing the oxide of alkali metals and/or alkaline-earth metals generated in the first-stage reduction process, and a second-stage reduction process of reducing the low-grade oxide powder obtained in the first-stage reduction process, with a melt solution of alkali metals and alkaline-earth metals to obtain niobium and/or tantalum powder.

2 Claims, 1 Drawing Sheet

METHOD OF MANUFACTURING NIOBIUM AND/OR TANTALUM POWDER

BACKGROUND OF THE INVENTION

1. Field of the Invention

This invention relates to niobium or tantalum powder suitable as an electrolyte capacitor material, and to a method of manufacturing the niobium or tantalum powder, and more particularly to a manufacturing method that reduces the niobium or tantalum oxides with alkali metals or alkaline-earth metals.

2. Description of Related Art

By reducing fluorides or oxides of niobium or tantalum with alkali metals such as sodium or potassium, or with alkaline-earth metals such as magnesium or calcium, and then evenly distributing the particles having an average diameter of 1.0 μm, it is possible to obtain very fine niobium or tantalum powder having a BET specific surface area that exceeds 5 $m^2/g$.

When using niobium or tantalum powder as electrolytic capacitor material, the capacity becomes larger the finer the powder is, or in other words the larger the specific surface area is.

However, niobium oxidizes easily, and since the oxides are stable, the finer the powder is, the greater the amount of oxygen becomes due to surface oxidation.

Moreover, when trying to obtain fine powder, in which the diameter of primary particles is 0.1 to 1.0 μm, by using alkali metals or alkaline-earth metals as the reduction agent, which is an exothermic reaction, there is thermal ununiformity during the reduction process, so very fine particles on the order of 0.01 μm are produced. When these kinds of very fine particles exist, there is the problem that uniformity in sintering of the electrolytic capacitor is lost.

Furthermore, there is a problem that the reduction agent or alkali metal or alkaline-earth metal dissolves and remains in the niobium or tantalum and has an adverse effect on the capacity and electrical characteristics of the electrolytic capacitor. In other words, the amount of reduction agent used in normal operation is more than the theoretical chemical equivalent, so part of the reduction agent dissolves in the niobium or tantalum. The solid solubility limit of alkali metals or alkaline-earth metals in the niobium or tantalum is small, however, even so alkali metals or alkaline-earth metals remains up to about 200–400 ppm. Therefore, with the prior art, it was difficult to reduce the amount of the reduction agent, or in other words, alkali metal or alkaline-earth metal to 200 ppm or less.

On the other hand, reduction of the niobium or tantalum oxides with alkali metal or alkaline-earth metal proceeds exothermically and the alkali metal or alkaline-earth metal is processed to come in direct contact with the niobium or tantalum oxides, so that controlling it becomes even more difficult.

In Japanese Patent Publication No. Tokukai 2000-119710, in order to control the amount of heat generated, reduction using alkaline-earth metal or rare-earth metal is performed in two stages, and in the reaction of the first stage, low-grade oxide powder expressed as (Nb,Ta) Ox, where x=0.5 to 1.5, is obtained. The second stage is then performed after removing the oxides of the reduction agent from the reduction product of the first stage. However, in this case, controlling the reduction reaction of the second stage is difficult and there was a problem in that the specific surface area of the powder obtained became small, and that the amount of remaining alkali metal and alkaline-earth metal became large.

SUMMARY OF THE INVENTION

An object of this invention is to provide niobium and/or tantalum powder that is suitable for an electrolytic capacitor, and to provide a method of manufacturing that powder.

Particularly, an object of this invention is to provide a manufacturing method in which the reduction of niobium and/or tantalum oxides by an alkali metal or alkaline-earth metal is performed in two stages, and where the specific surface area of the powder obtained is increased and where the oxygen content per specific surface area and the amount of remaining alkali metal or alkaline-earth metal is reduced.

DESCRIPTION OF THE PREFERRED EMBODIMENTS

Figure 1:
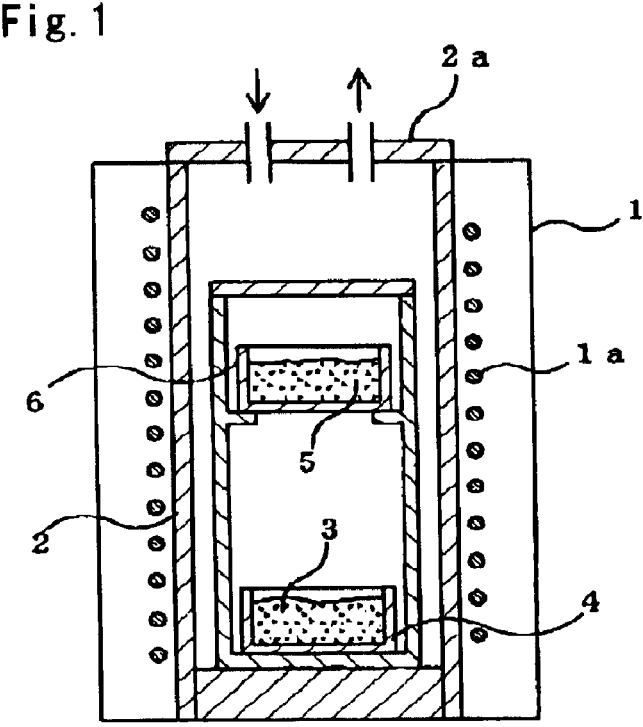
FIG. 1 is a diagrammatic cross sectional view to show a specific example of the apparatus to work the present invention.

The method of manufacturing niobium and/or tantalum powder of this invention comprises the following processes:

(1) A first-stage reduction process of reducing the niobium and/or tantalum oxides by at least one member selected from the group of alkali metals and alkaline-earth metals to obtain low-grade oxide powder represented by (Nb,Ta) Ox, where x=0.06 to 0.35.

(2) A process of removing the oxide of alkali metals and/or alkaline-earth metals that was generated by the first-stage reduction process.

(3) A second-stage reduction process of reducing the low-grade oxide powder that was obtained in the first-stage reduction process, wherein a melt solution of at least one member selected from the group of alkali metals and alkaline-earth metals is used in a temperature range of 400 to 1200° C., to obtain niobium and/or tantalum powder.

In the second-stage reduction process, when reducing the low-grade oxide powder that was obtained in the first-stage reduction process with at least one member selected from the group of alkali metals and alkaline-earth metals, it is preferred that the quantity in mixture of the at least one member selected from the group of alkali metals and alkaline-earth metals be adjusted to a chemical equivalent of 0.5 to 1.5 for the stoichiometry required for removing the oxygen remaining in the low-grade oxide powder, so that the remaining amount of the at least one member selected from the group of alkali metals and alkaline-earth metals be 200 ppm or less. Performing the reaction of second-stage reduction process in a temperature range of 400 to 1200° C. is also effective in lowering the amount of remaining metal.

In the second-stage reduction process, by bringing the low-grade oxide powder in direct contact with the at least one member selected from the group of alkali metals and alkaline-earth metals, the primary particles are adjusted at the same time as the oxygen is removed, so that the niobium and/or tantalum powder of this invention is evenly distributed with a primary particle diameter of 0.1 to 1.0 μm and the ratio of the amount of oxygen expressed in ppm to the BET specific surface area expressed in $m^2/g$ is 3100 or less.

In this invention, reduction of niobium and/or tantalum oxides by alkali metals or alkaline-earth metals to obtain niobium and/or tantalum powder is divided and performed in two stages, where in the first stage low-grade oxide powder that is represented by (Nb,Ta) Ox, where x=0.06 to 0.35, is obtained, and then in the second stage, the oxides of alkali metal and alkaline-earth metal that were generated in the reduction reaction of the first stage are removed and the low-grade oxide powder obtained in the first-stage reduction process is reduced with a melt of alkali metal or alkaline-earth metal to obtain niobium and/or tantalum powder. In this case, in order to control the first-stage reaction, it is desirable to add the materials in succession or to use vapor for addition. Also, by using these methods, the process can further be divided into more stages.

When the value for 'x' less than 0.06, reduction is partially performed, and the alkali metal or alkaline-earth metal used as the reduction agent is diffused into the niobium or tantalum, and remains as an impurity. When the value of 'x' is greater than 0.35, there is an excessive amount of oxygen, so that in the second-stage process, much heat is generated and the particles become coarse.

In the second-stage reduction process, since a melt of alkali metal or alkaline-earth metal as the reduction agent exists, surface diffusion of the niobium or tantalum is hindered, so that it is possible to suppress any reduction of specific surface area when the particles bond to each other. Also, the melt of alkali metal or alkaline-earth metal as the reduction agent has good wettability, and so by the capillary phenomenon it can permeate evenly into the fine niobium or tantalum powder. As a result, it is possible to suppress the generation of very fine particles on the order of 0.01 $\mu$m, and to obtain fine powder having evenly distributed primary particles with a particle diameter of 0.1 to 1.0 $\mu$m.

When reducing the low-grade oxide powder obtained in the first-stage reduction process with alkali metal or alkaline-earth metal, it is possible to lower the amount of remaining alkali metal or alkaline-earth metal to 200 ppm or less by adjusting the quantity in mixture of the alkali metal or alkaline-earth metal to a chemical equivalent of 0.5 to 1.5 for the stoichiometry required for removing the oxygen remaining in the low-grade oxide powder. This is because when the melt of alkali metal or alkaline-earth metal comes on contact with the niobium or tantalum it reacts with the remaining oxygen and becomes an oxide, so that it becomes difficult for the alkali metal or alkaline-earth metal to dissolve in the niobium or tantalum through solid solution. When the chemical equivalent is less than 0.5, reduction is insufficient and an excessive amount of oxygen remains, and when the chemical equivalent is greater than 1.5, the amount of remaining reduction agent, or in other words, the amount of remaining alkali metal or alkaline-earth metal increases.

Moreover, even though the chemical equivalent of the quantity in mixture of alkali metal or alkaline-earth metal is a little insufficient, specifically 0.5 to 1.5 for the stoichiometry required for removing the oxygen remaining in the low-grade oxide powder, the amount of remaining oxygen is 7000 ppm or less, the BET specific surface area expressed by $m^2/g$ is 0.6 or more, and the ratio of remaining oxygen to BET specific surface area is 3100 ppm or less. This is thought to be because the melt of the alkali metal or alkaline-earth metal used as the reduction agent has good wettability, and by the capillary phenomenon, it permeates evenly into the fine niobium or tantalum powder.

The niobium and/or tantalum oxides used as the raw material are not particularly limited, however niobium pentoxide, tantalum pentoxide or a mixture of both is preferred. Also, sodium, potassium, magnesium and calcium are preferred as the alkali metals and alkaline-earth metals to be used as the reduction agent.

In the first-stage reduction process, the alkali metal or alkaline-earth metal is placed separate from the niobium or tantalum oxide, and then the alkali metal or alkaline-earth metal is brought into contact with the niobium or tantalum oxide in vapor form. In this way, the speed of reaction in the reduction stage becomes steady, and it is possible to suppress the amount of heat generation per unit time. The reduction speed can be controlled by the vapor pressure of the alkali metal or alkaline-earth metal, and the temperature of the applied heat. It is preferred that the temperature of the applied heat in the first stage be 600 to 1400° C., and that the amount of time when heat is applied be 1 to 8 hours depending on the particle size.

For example, in the case of magnesium, it is preferred that the temperature of the applied heat be 800° C. or more. When the temperature of applied heat is less than 800° C., an endothermic reaction occurs due to vaporization, so that vaporization of magnesium does not proceed sufficiently. In the case of other alkali metals or alkaline-earth metals, the temperature of the applied heat can selected according to the amount of heat generated per unit time, and the amount of time to the end of the reduction process.

When the temperature of the low-grade oxide powder that is obtained by reduction exceeds 1400° C., sintering occurs and the powder becomes coarse, so it is preferred that the reduction temperature be 1400° C. or less. On the other hand, when the temperature is less than 600° C., there is not enough of a reaction. The reduction reaction ends in 8 hours or less, so it is not necessary to maintain the reaction longer than this. When the reaction is maintained at high temperature for a long time, there is a possibility that the particles will become coarse. When the reaction is carried out for less than one hour, there is a possibility that the reduction reaction will be insufficient.

Also, by performing reduction in an atmosphere of inert gas such as argon or nitrogen, the reduction reaction can proceed evenly and stably.

The second-stage reduction process differs from the first-stage reduction in that the low-grade oxide powder is mixed with a melt of specific reduction metal. With the existence of the melted reduction metal, surface diffusion of the niobium or tantalum is hindered, so that it is possible to suppress a decrease in the specific surface area. Also, as in the first stage, it is preferred that the second-stage reduction be performed in a temperature range of 400 to 1200° C. wherein the temperature in the second stage is the same to or lower than the temperature in the first stage, and that the amount of time that heat is applied be 1 to 4 hours. Normally, the solid solubility limit of the impurity elements in the niobium or tantalum increases with the temperature rise and also dispersion becomes faster. When the temperature is high as in the case of vapor reduction, reduction is performed sufficiently, and when there is excessive reduction-metal vapor, the solubility of the reduction metal becomes large and thus the amount of remaining reduction metal increases. Therefore, the second-stage reduction is performed in a temperature range that is the same or lower than that of the first stage, or to be more specific, it is necessary to use a mixing method in order to perform complete reduction using a specified amount of reduction agent in a temperature range of 400 to 1200° C.

In the first stage the niobium and/or tantalum oxide is reduced using alkali metal or alkaline-earth metal until a low-grade oxide powder expressed by (Nb,Ta) Ox, where x=0.06 to 0.35, is obtained, and the end of that reduction process is determined by measuring the change in mass of the reduced material.

To remove the oxides of the alkali metal and/or alkaline-earth metal that were generated in the first-stage reduction process, leaching is performed using acid.

In the second-stage reduction, where the low-grade oxide powder that was obtained in the first-stage reduction is reduced using alkali metal or alkaline-earth metal to obtain niobium or tantalum powder, attention is placed on using a melt solution as the reduction agent and on performing complete reduction using a specific amount of reduction agent at low temperature.

Measurement of the average particle diameter can be performed using a laser diffraction method such as micro tracking, measurement of the amount of oxygen contained can be performed using an oxygen analyzer that employs infrared adsorption, and measurement of the specific surface area can be performed by a method based on ISO9277 or the like.

EXAMPLES

Examples and comparatives examples will be explained below. (Refer to Table 1).

Example 1

A cylindrical-shaped reaction vessel 2 made from niobium was placed in a vertical-type electric furnace 1 as shown in FIG. 1, then a bucket 4 made from niobium for the reduction metal 3 was placed on the bottom of the reaction vessel 2, and a tray 6 made from niobium for the raw oxide material 5 was placed above the bucket 4 such that there was plenty of space between the tray 6 and the bucket 4.

500 g of niobium pentoxide powder (average particle diameter: 3.5 μm) was inserted as the raw material, and magnesium (Ube Sangyo, Ltd. purity: 99.97%, large piece), having a chemical equivalent of 1.1 moles with respect to the oxide powder was used as the reduction metal.

A cover 2a was placed on the reaction vessel 2 made from niobium, and argon gas was supplied at a rate of 100 ml/min through a gas-supply hole formed in the cover 2a, while at the same time the temperature inside the reaction vessel 2 was maintained at 1000° C. by the heating element 1a of the electric furnace 1, and the reaction was carried out for 6 hours. After cooling, the low-grade oxide powder in the tray 6 was taken out, and immersed in 1-normal hydrochloric acid to remove by dissolving the magnesium oxide, and then the powder was washed in water and dried. The low-grade oxide powder that was obtained had $NbO_{0.3}$ composition and a mass of 360 g.

The low-grade oxide powder was placed as is into the tray 6 of the reaction vessel 2 made from niobium, and a 0.9 chemical equivalent of magnesium (Kanto Chemical Co., cut piece, purity: 99% or greater) is added to and mixed with the low-grade oxide powder in the tray 6, and the melting reaction was carried out for 2 hours at 800° C.

In other words, the cover 2a was placed on the reaction vessel 2 made from niobium and argon gas was supplied at a rate of 100 ml/min through the gas-supply hole formed in the cover 2a, while at the same time the temperature inside the reaction vessel 2 was maintained at 800° C. by the heating element 1a of the electric furnace 1, and the reaction was carried out for 2 hours. After cooling, the powder in the tray 6 was taken out and immersed in 1 normal hydrochloric acid to remove the magnesium oxide by dissolving, and then the powder was washed in water and dried. The powder was pure niobium powder, the BET specific surface area, the average particle diameter and oxygen content of which were measured, and it was found that the BET specific surface area was 1.6 m$^2$/g, average particle diameter was 0.6 μm, the oxygen content was 4800 ppm and the magnesium content was 150 ppm.

Example 2

In example 1, the reaction temperature of the first-stage reduction process was changed to 1100° C., and the low-grade oxide powder that was obtained in the first stage reduction process was placed as is into the tray 6 made from niobium, and 0.8 chemical equivalent of magnesium (Kanto Chemical Co, cut piece, purity: 99% or more) was added to and mixed with the low-grade oxide powder. The oxide powder had an $NbO_{0.3}$ composition and mass of 365 g.

In the second-stage reduction process, the cover 2a was placed on the reaction vessel 2 made from niobium and argon gas was supplied at a rate of 100 ml/min through the gas-supply hole formed in the cover 2a, while at the same time the temperature inside the reaction vessel 2 was maintained at 750° C. by the heating element 1a of the electric furnace 1, and the melting reaction was carried out for 4 hours. After cooling, the powder in the tray 6 was taken out and immersed in 1 normal hydrochloric acid to dissolve and remove the magnesium oxide, and then the powder was washed in water and dried. The powder was pure niobium powder, the BET specific surface area, the average particle diameter and oxygen content of which were measured, and it was found that the BET specific surface area was 2.0 m$^2$/g, average particle diameter was 0.5 μm, the oxygen content was 5700 ppm and the magnesium content was 130 ppm.

Example 3

A cylindrical-shaped reaction vessel 2 made from niobium was placed in a vertical-type electric furnace 1 as shown in FIG. 1, then a niobium bucket 4 for the reduction metal 3 was placed on the bottom of the reaction vessel 2, and a niobium tray 6 for the raw oxide material 5 was placed above the niobium bucket 4 such that there was plenty of space between the niobium tray 6 and the bucket 4.

500 g of tantalum pentoxide powder (average particle diameter: 2.4 μm) was inserted as the raw material, and magnesium (Ube Sangyo, Ltd, purity: 99.97%, large piece), having a chemical equivalent of 1.0 mole with respect to the oxide powder was used as the reduction metal 3.

A cover 2a was placed on the niobium reaction vessel 2, and argon gas was supplied at a rate of 100 ml/min through a gas-supply hole formed in the cover 2a, while at the same time the temperature inside the reaction vessel 2 was maintained at 1000° C. by the heating element 1a of the electric furnace 1, and the reaction was carried out for 6 hours. After cooling, the low-grade oxide powder in the tray 6 was taken out and immersed in 1-normal hydrochloric acid to dissolve and remove the magnesium oxide, and then the powder was washed in water and dried. The low-grade oxide powder that was obtained had $TaO_{0.2}$ composition and a mass of 392 g.

The low-grade oxide powder was placed into the reaction vessel 2 made from niobium, and a 0.8 mole chemical equivalent of magnesium (Kanto Chemical Co., cut piece, purity: 99% or greater) was added to and mixed with the low-grade oxide powder.

The cover 2a was placed on the reaction vessel 2 made from niobium and argon gas was supplied at a rate of 100 ml/min through the gas-supply hole formed in the cover 2a, while at the same time the temperature inside the reaction vessel 2 was maintained at 800° C. by the heating element 1a of the electric furnace 1, and the melting reaction was carried out for 2 hours. After cooling, the powder in the tray 6 was taken out and immersed in 1 normal hydrochloric acid to dissolve and remove the magnesium oxide, and then the powder was washed in water and dried. The powder was pure tantalum powder the BET specific surface area, the average particle diameter and oxygen content of which were measured, and it was found that the BET specific surface area was 3.2 m$^2$/g, average particle diameter was 0.4 μm, the oxygen content was 3000 ppm and the magnesium content was 110 ppm.

Example 4

A cylindrical-shaped reaction vessel 2 made from niobium was placed in a vertical-type electric furnace 1 as shown in FIG. 1, then a niobium bucket 4 for the reduction metal 3 was placed on the bottom of the reaction vessel, and a niobium tray 6 for the raw oxide material 5 was placed above the niobium bucket 4 such that there was plenty of space between the niobium tray 6 and the niobium bucket 4.

500 g of niobium oxide powder (average particle diameter: 3.5 μm) was inserted as the raw material, and magnesium (Ube Sangyo, Ltd, purity: 99.97%, large piece), having a chemical equivalent of 1.0 mole with respect to the oxide powder was used as the reduction metal 3.

A cover 2a was placed on the niobium reaction vessel 2, and argon gas was supplied at a rate of 100 ml/min through a gas-supply hole formed in the cover 2a, while at the same time the temperature inside the reaction vessel 2 was maintained at 1000° C. by the heating element 1a of the electric furnace 1, and the reaction was carried out for 4 hours. After cooling, the low-grade oxide powder in the tray 6 was taken out and immersed in 1-normal hydrochloric acid to dissolve and remove the magnesium oxide, and then the powder was washed in water and dried. The low-grade oxide powder that was obtained had $TaO_{0.15}$ composition and a mass of 355 g.

The low-grade oxide powder was placed into the niobium tray, and a 0.9 mole chemical equivalent of magnesium (Kanto Chemical Co., cut piece, purity: 99% or greater) was added to and mixed with the low-grade oxide powder.

The cover 2a was placed on the niobium reaction vessel 2 and argon gas was supplied at a rate of 100 ml/min through the gas-supply hole formed in the cover 2a, while at the same time the temperature inside the reaction vessel 2 was maintained at 800° C. by the heating element 1a of the electric furnace 1, and the reaction was carried out for 2 hours. After cooling, the powder in the tray 6 was taken out and immersed in 1 normal hydrochloric acid to dissolve and remove the magnesium oxide, and then the powder was washed in water and dried. The powder was pure niobium powder, the BET specific surface area, the average particle diameter and oxygen content of which were measured, and it was found that the BET specific surface area was 1.9 $m^2/g$, average particle diameter was 0.5 μm, the oxygen content was 4300 ppm and the magnesium content was 130 ppm.

Example 5

A cylindrical-shaped reaction vessel 2 made from niobium was placed in a vertical-type electric furnace 1 as shown in FIG. 1, then a niobium bucket 4 for the reduction metal 3 was placed on the bottom of the reaction vessel, and a niobium tray 6 for the raw oxide material 5 was placed above the niobium bucket 4 such that there was plenty of space between the tray 6 and the bucket 4.

500 g of tantalum pentoxide powder (average particle diameter: 2.4 μm) was inserted as the raw material 3, and sodium (Kanto Chemical Co., purity: 99%, large piece), having a chemical equivalent of 1.0 moles with respect to the oxide powder was used as the reduction metal.

A cover 2a was placed on he niobium reaction vessel 2, and argon gas was supplied at a rate of 100 ml/min through a gas-supply hole formed in the cover 2a, while at the same time the temperature inside the reaction vessel 2 was maintained at 800° C. by the heating element 1a of the electric furnace 1, and the reaction was carried out for 6 hours. After cooling, the low-grade oxide powder in the tray 6 was taken out and immersed in 1 normal hydrochloric acid to dissolve and remove the sodium oxide, then the powder was washed in water and dried. The low-grade oxide powder that was obtained had $TaO_{0.2}$ composition and a mass of 392 g.

The low-grade oxide powder thus obtained was placed into the niobium tray 6, and a 0.8 mole chemical equivalent of sodium (Kanto Chemical Co., pellets, purity: 98% or greater) was added to and mixed with the low-grade oxide powder.

The cover 2a was placed on the niobium reaction vessel 2 and argon gas was supplied at a rate of 100 ml/min through the gas-supply hole formed in the cover 2a, while at the same time the temperature inside the reaction vessel 2 was maintained at 400° C. by the heating element 1a of the electric furnace 1, and the reaction was carried out for 2 hours. After cooling, the powder in the niobium tray 6 was taken out and immersed in 1 normal hydrochloric acid to dissolve and remove the sodium oxide, and then the powder was washed in water and dried. The powder was pure tantalum powder, the BET specific surface area, the average particle diameter and oxygen content of which were measured, and it was found that the BET specific surface area was 1.0 $m^2/g$, average particle diameter was 0.6 μm, the oxygen content was 3000 ppm and the magnesium content was 48 ppm.

Comparative Example 1

In example 1, the chemical equivalent of magnesium in the second-stage reduction process was changed to be 1.7 and reduction was performed at 1050° C. for 4 hours. The obtained reduced material was immersed in 1 normal hydrochloric acid to leach the magnesium oxide, then the powder was washed in water and dried. The powder was pure niobium metal and the mass was 340 g. The BET specific surface area was 2.1 $m^2/g$, the average particle diameter was 0.8 μm, the oxygen content was 5100 ppm and the magnesium content was 370 ppm.

Comparative Example 2

In example 1, the chemical equivalent of magnesium in the first-stage reduction process was changed to be 0.85 and reduction was performed at 1050° C. for 4 hours. The obtained reduced material was immersed in 1 normal hydrochloric acid to leach the magnesium oxide, and then the powder was washed in water and dried. The composition of the powder was $NbO_{0.4}$ and the mass was 370 g. In the second-stage reduction process a 0.9 chemical equivalent of magnesium was added and mixed with the powder and the melting reaction was performed at 800° C. for 2 hours. The BET specific surface area was 0.6 $m^2/g$, the average particle diameter was 2.3 μm, the oxygen content was 7300 ppm and the magnesium content was 570 ppm. The amount of heat generated by the powder during the second-stage reduction was large and the particles became coarse, also it was thought that magnesium was mixed in with the powder due to localized heat generation.

Comparative Example 3

In example 1, the chemical equivalent of magnesium in the first-stage reduction process was changed to be 0.95 and reduction was performed at 1050° C. for 4 hours. The obtained reduced material was immersed in 1 normal hydrochloric acid to exude the magnesium oxide, and then the powder was washed in water and dried. The composition of the powder was $NbO_{0.25}$ and the mass was 355 g. In the second-stage reduction process a 0.3 chemical equivalent of magnesium was added and mixed with the low-grade oxide powder and the reaction was performed at 800° C. for 2 hours. The BET specific surface area was 1.8 $m^2/g$, the average particle diameter was 0.5 μm, the oxygen content was 29000 ppm and the magnesium content was 6 7 ppm.

Comparative Example 4

In example 1, the chemical equivalent of magnesium in the first-stage reduction process was changed to be 0.95 and reduction was performed at 1050° C. for 4 hours. The obtained reduced material was immersed in 1 normal hydrochloric acid to leach the magnesium oxide, and then the powder was washed in water and dried. The composition of the powder was $NbO_{0.25}$ and the mass was 355 g. In the second-stage reduction process a 2.0 chemical equivalent of magnesium was added and mixed with the low-grade oxide powder and the reaction was performed at 800° C. for 2 hours. The BET specific surface area was 1.6 $m^2/g$, the average particle diameter was 0.6 μm, the oxygen content was 5300 ppm and the magnesium content was 370 ppm.

TABLE 1

|  | Material | Reduction agent (Mole chemical equivalent) First stage | Reduction agent (Mole chemical equivalent) Second stage | X | Temperature (Time) First stage | Temperature (Time) Second stage |
|---|---|---|---|---|---|---|
| Example 1 | Nb oxide | Mg(1.1) | Mg(0.9) | 0.2 | 1000(6) | 800(2) |
| Example 2 | Nb oxide | Mg(1.1) | Mg(0.8) | 0.3 | 1100(6) | 750(4) |
| Example 3 | Ta oxide | Mg(1.0) | Mg(0.8) | 0.2 | 1000(6) | 800(2) |
| Example 4 | Nb oxide | Mg(1.0) | Mg(0.9) | 0.15 | 1000(4) | 800(2) |
| Example 5 | Ta oxide | Na(1.0) | Na(0.8) | 0.2 | 800(6) | 400(2) |
| C-Ex 1 | Nb oxide | Mg(1.1) | Mg(1.7) | 0.2 | 1000(6) | 1050(4) |
| C-Ex 2 | Nb oxide | Mg(0.85) | Mg(0.9) | 0.4 | 1050(4) | 800(2) |
| C-Ex 3 | Nb oxide | Mg(0.95) | Mg(0.3) | 0.25 | 1050(4) | 800(2) |
| C-Ex 4 | Nb oxide | Mg(0.95) | Mg(2.0) | 0.25 | 1050(4) | 800(2) |

(C-Ex:Comparative Example)

This invention provides a method of reducing niobium or tantalum oxide using an alkali metal or alkaline-earth metal, and by controlling the amount of reduction agent, it is capable of providing fine niobium or tantalum powder, having a small amount of remaining oxygen and reduction metal, that is suitable as an electrolyte capacitor.

What is claimed is:

1. A method of manufacturing niobium and/or tantalum powder consisting of:
   (1) a first-stage reduction process of reducing niobium and/or tantalum oxides with at least one member selected from the group of alkali metals and alkaline-earth metals to obtain low-grade oxide powder represented by (NbTa) Ox, where x=0.06 to 0.35, wherein the at least one member is turned to an oxide,
   (2) a process of removing the oxide of at least one member generated in the first-stage reduction process, and
   (3) a second-stage reduction process of reducing the low-grade oxide powder obtained in the first-stage reduction process, with a melt solution of at least one member selected from the group of alkali metals and alkaline-earth metals in a temperature range of 400 to 1200° C., to obtain niobium and/or tantalum powder.

2. The method of manufacturing niobium and/or tantalum powder according to claim 1, wherein in the second-stage reduction process, when reducing the low-grade oxide powder obtained in the first-stage reduction process with the at least one member selected from the group of alkali metals and alkaline-earth metals, the quantity in mixture of the at least one member is adjusted to a chemical equivalent of 0.5 to 1.5 for the stoichiometry required for removing the oxygen remaining in the low-grade oxide powder, so that the remaining amount of the at least one member is up to 200 ppm in the niobium and/or tantalum powder.

* * * * *